United States Patent [19]

Heytmeijer et al.

[11] 4,396,595
[45] Aug. 2, 1983

[54] METHOD OF ENHANCING THE OPTICAL TRANSMISSIVITY OF POLYCRYSTALLINE ALUMINA BODIES, AND ARTICLE PRODUCED BY SUCH METHOD

[75] Inventors: Herman R. Heytmeijer, Hanover; Rudolf F. Strobel, Union, both of N.J.

[73] Assignee: North American Philips Electric Corp., New York, N.Y.

[21] Appl. No.: 346,715

[22] Filed: Feb. 8, 1982

[51] Int. Cl.[3] .............................................. C04B 35/64
[52] U.S. Cl. .................................... 423/625; 264/1.2; 264/62; 264/65; 264/86
[58] Field of Search .................... 264/1.2, 62, 86, 65; 501/153; 423/628

[56] References Cited

U.S. PATENT DOCUMENTS

| 3,026,210 | 3/1962 | Coble | 106/39 |
| 3,619,309 | 11/1971 | Faktor | 264/62 |
| 3,875,277 | 4/1975 | Bratton | 264/65 |
| 3,935,495 | 1/1976 | Scott, Jr. et al. | 313/220 |
| 4,031,177 | 6/1977 | Auriol | 264/65 |
| 4,079,167 | 3/1978 | Scott, Jr. et al. | 428/409 |
| 4,150,317 | 4/1979 | Laska et al. | 313/221 |
| 4,169,875 | 10/1979 | Laska et al. | 264/63 |

FOREIGN PATENT DOCUMENTS 53-47415  4/1978  Japan .................................. 264/65

Primary Examiner—John A. Parrish

[57] ABSTRACT

The in-line transmission of a translucent polycrystalline alumina arc tube for a high-pressure sodium discharge lamp is improved by as much as 50% by dipping the "green" tubular compact in an aqueous slurry containing finely-divided alumina particles and, after the slurry-dipped compact has been dried, subjecting it to the usual pre-sintering and sintering operations required to convert the compact into a dense ceramic body. The slurry is preferably prepared from the same slurry which contains the blended alumina powder, magnesia and other additives that comprise the raw-mix slurry which is spray-dried to produce the larger size generally spherical particles that are compressed or extruded to form the green compact.

15 Claims, 1 Drawing Figure

METHOD OF ENHANCING THE OPTICAL TRANSMISSIVITY OF POLYCRYSTALLINE ALUMINA BODIES, AND ARTICLE PRODUCED BY SUCH METHOD

BACKGROUND OF THE INVENTION

This invention generally relates to the electric lamp art and has particular reference to a method of improving the optical transmissivity of polycrystalline alumina arc tubes during manufacture, and to arc tubes which are produced by such method.

High-density polycrystalline alumina is a well known translucent ceramic material and a detailed disclosure of the various operations required to manufacture it from compressed finely-divided alumina of high purity in a form suitable for use as light-transmitting arc tubes for high-intensity electric discharge lamps (such as high-pressure sodium vapor lamps) is presented in U.S. Pat. No. 3,026,210 issued Mar. 20, 1962 to R. L. Coble. In accordance with the teachings of this patent, additions of small but effective amounts of magnesia up to 0.5 weight percent are included in the raw-mix composition to improve the optical transparency of the sintered alumina tubing. Since the amount of useful light produced by a high-intensity discharge lamp is inherently controlled by the ability of the arc tube to transmit the visible radiations generated by the discharge, intensive research has been conducted to discover and develop various ways of improving the optical transmission characteristics of arc tubes composed of polycrystalline alumina. In accordance with one prior art approach to this problem, the sintered tubing is subjected to a flux polishing treatment in a bath of molten sodium borate at a temperature in the range of from about 762° C. to 857° C. This arc tube polishing concept is disclosed in U.S. Pat. Nos. 3,935,495 and 4,079,167 issued to G. E. Scott, Jr. et al.

As stated in the aforementioned patents, the flux polishing process reduces the high spots on individual exterior alumina crystals without materially introducing low spots at the grain boundaries with the result that the treated arc tube has a smoother surface and exhibits increased optical transmission. However, the fluxing action leaves a glassy coating on the arc tubes which must be removed by washing them in a dilute mineral acid solution after the tubes have been withdrawn from the molten flux bath and allowed to cool to ambient temperature. Thus, while the flux polishing process achieves the desired objective of increasing the optical transmission characteristics of the arc tubes, it is expensive and time consuming and, as such, is not particularly suitable for use in the manufacture of high-pressure discharge lamps in mass-production quantities.

U.S. Pat. Nos. 4,150,317 and 4,169,875 to H. M. Laska et al. disclose the concept of improving the in-line transmission characteristics of polycrystalline alumina arc tubes by using alumina powder that is very pure (99.99% pure and devoid of grain-growth promoting impurities such as sodium and iron) and also limiting the magnesia content in the raw-mix composition to 0.1% by weight or less. The patents indicate that the reduction in the magnesia constituent prevents the formation of secondary magnesia alumina spinel phase at the grain boundaries in the final sintered product.

It would accordingly be very advantageous from both a cost and manufacturing standpoint if an inexpensive method could be provided for improving the optical transmission characteristics of polycrystalline alumina tubing which would not materially disrupt or delay the normal sequence of operations required to form the tubing from powdered raw materials.

SUMMARY OF THE INVENTION

The foregoing objectives are achieved in accordance with the present invention by compressing or extruding powdered raw materials of standard-grade purity (alumina that is 99.99% pure) to form a "green" tubular compact of alumina particles in the conventional manner and then dipping the compact in an aqueous slurry of finely-divided alumina particles that are also free of impurities (99.99% pure). At this stage of fabrication, the green compact is quite porous and readily soaks up the alumina slurry so that the latter enters the pores and coats the surface of the compact. The tubular compact is then dried with the result that the slurry-deposited alumina particles are not only trapped in the pores but fill the low spots and interstitial surface cavities which microscopic examination reveals inherently exist in the surface of the compact. The slurry-impregnated-and-coated tubular compact is then subjected to the normal pre-sintering and sintering operations which convert the porous compact into a high-density polycrystalline alumina ceramic tube—with the result that the slurry-deposited alumina particles are fused to and become integral parts of the finished tube. The "leveling" effect of the fused slurry-deposited alumina particles not only provides the surface of the sintered arc tube with a smooth "polished" finish but also increases the density of the polycrystalline alumina by filling minute pores and other voids in its ceramic structure.

In accordance with the preferred embodiment, only the exterior surface of the tubular green compact is exposed to and coated with the aqueous slurry of alumina so that air can escape from the interior surface of the compact into the atmosphere during and after the dipping operation. This is conveniently accomplished by temporarily capping one end of the tubular compact and immersing that end of the compact into the slurry without allowing any of the slurry to flow into the open end of the compact.

BRIEF DESCRIPTION OF THE DRAWING

A better understanding of the invention will be obtained from the exemplary embodiment shown in the accompanying drawing, wherein.

PREFERRED EMBODIMENT OF THE INVENTION

While the present invention can be used with advantage in the manufacture of polycrystalline alumina articles of various shapes and sizes which constitute components for various kinds of devices which require a durable light-transmitting ceramic material, it is especially adapted for use in conjunction with the production of ceramic arc tubes for high-intensity electric discharge lamps and it has accordingly been so illustrated and will be so described.

Figure 1:
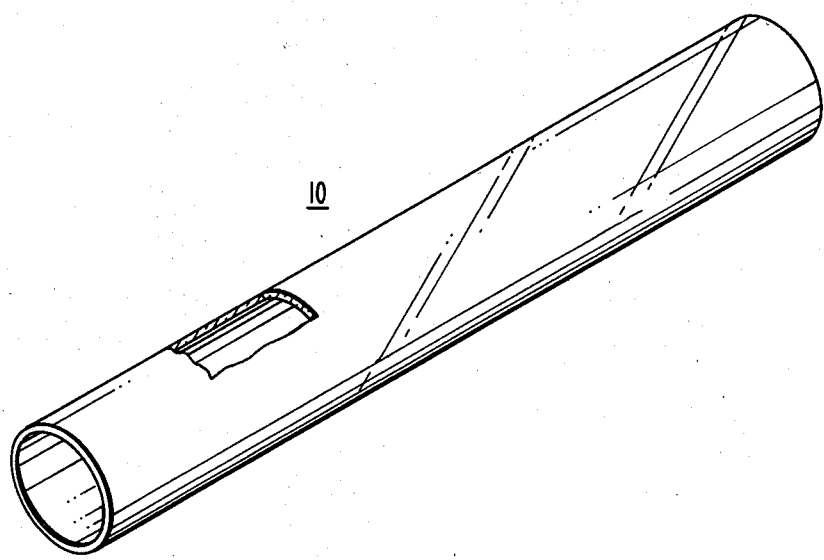
FIG. 1 is a perspective view of a hollow tubular body of sintered polycrystalline alumina that is suitable for use as the arc tube for a high-pressure sodium discharge lamp and is representative of the kind of article which can be treated by the method of the present invention.

As shown in FIG. 1, the ceramic polycrystalline alumina body comprises a hollow cylindrical tube 10 in its finished form when its intended use is that of an envelope for a high-pressure sodium discharge lamp or similar light source. Such tubular envelopes typically have a translucent "frosted" appearance and, in the case of a 400 watt lamp, have a length dimension of 14 inches (35.5 cm.), an outer diameter of ⅜ inch (9.5 mm) and a wall thickness of approximately 0.03 inch (0.75 mm).

Figure 2:
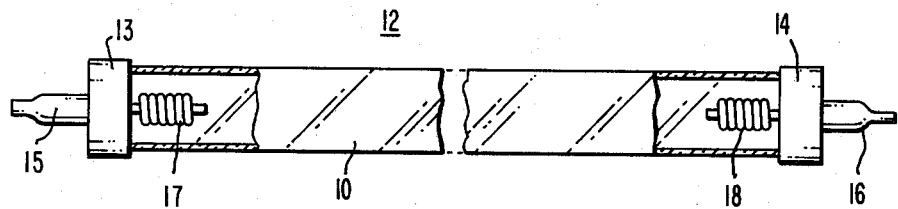
FIG. 2 is a side elevational view of a high-pressure sodium discharge lamp wherein such a polycrystalline alumina tube is employed as the ceramic envelope component.

As illustrated in FIG. 2, the arc tube 12 for such a discharge lamp is formed by sealing the ends of the alumina envelope 10 by end caps 13, 14 that are fabricated from a suitable metal such as niobium and are terminated by tubular segments 15, 16 which are hermetically closed by a welding or brazing operation in accordance with standard lamp-making practice. The end caps can also be made from polycrystalline alumina and, in this case, would comprise discs that are fused to lead-in rods of niobium or other suitable metal. The envelope 10 contains a pair of electrode coils 17, 18 that are supported at opposite ends of the envelope by metal rods fastened to the associated end caps. The envelope also contains an ionizable medium comprising sodium (or a combination of sodium and mercury) and an inert starting gas such as xenon at a pressure of 20 Torr, for example, which sustains an arc discharge that passes between the electrodes 17, 18 when the arc tube 12 is connected to a suitable power supply. As is customary in the manufacture of this type of discharge lamp, the arc tube 12 and its current-limiting components are secured to a suitable support-mount assembly which is sealed into an outer protective envelope (not shown) that is fitted with a base member.

The green compact or body which is treated in accordance with the present invention is formed in the usual manner from high-purity (99.99% pure) alumina ($Al_2O_3$) and a small but critical amount of magnesia (MgO) that are combined with one another to provide a raw-mix material that is processed into generally spherical particles of such size that they can be readily compressed into a body of the desired shape and size. The blending of the raw-mix ingredients is achieved by suspending the finely-divided particles in distilled water to form an aqueous raw-mix slurry which is then spray-dried to form spherical particles of the desired larger size.

As a specific example, 10,000 grams (approximately 59% by weight) of powdered $Al_2O_3$ of sub-micron size (average particle size in the range of around 0.3 micron) is added to about 5,000 cc's of distilled water (approximately 30% by weight) together with about 10 grams of powdered MgO (about 0.06% by weight), 300 cc's (approximately 1.8% by weight) of a suitable wetting or dispersing agent that is organic and soluble in water, and a selected amount of a suitable organic binder such as polyvinyl alcohol in a 20% aqueous solution. The raw-mix slurry can also contain minor but controlled amounts of a suitable organic lubricant and a defoaming agent that are both soluble in water. In the aforesaid specific example of a raw-mix formulation, approximately 1,000 cc's (approximately 6% by weight) of the 20% aqueous solution of polyvinyl alcohol was employed along with 400 cc's (about 2.4% by weight) of polyethylene glycol or other suitable organic lubricant and up to about 0.005% by weight of an organic defoaming agent.

The resulting raw-mix slurry contained approximately 60% solids and, after being thoroughly mixed, was spray dried to remove the water and form spherical particles of the blended raw-mix materials. The spray-dried powder was then passed through a 60 mesh screen to remove oversize particles and agglomerates of powder. The screened material comprised generally spherical particles of the raw-mix formulation that ranged from about 10 microns to 70 microns in size and had an average particle size of approximately 50 microns. A predetermined amount of these raw-mix particles was subsequently fed into the mold of a suitable isostatic press apparatus and compressed between a metal mandrel and outer mold form of urethane or other suitable material. Hydraulic pressure (in the range of from about 15,000 to 30,00 psi) was applied to the spherical raw-mix particles to form a green compact of the hollow tubular configuration shown in FIG. 1.

In accordance with this invention, the green compact produced by the above-described sequence of operations is placed in contact with an aqueous slurry that contains finely-divided alumina particles of high-purity and sub-micron size so that the slurry covers the entire surface of the compact which is to be treated. The green compact is inherently quite porous at this stage and the aqueous slurry of alumina quickly enters the pores of the compact aided by capillary action. The porous green tubular compact accordingly readily soaks up the alumina slurry and the latter coats the surface of the compact. While the alumina slurry can be applied to the compact by a suitable spraying apparatus or other means, it is more convenient to simply dip or immerse the compact in a bath of the alumina slurry and this method of application is preferred.

In the case of a hollow tubular compact of the type described which is destined for use as the envelope for an arc tube, it is important that only the outer surface of the tubular compact be placed in contact with the alumina slurry and that the interior surface be left uncoated and exposed to the atmosphere to permit the air in the pores of the compact to escape from the compact after the dipping operation. If both the inner and outer surfaces of the compact are coated with the slurry, the air in the pores of the compact forms bubbles in the coating (after the compact is withdrawn from the slurry) which burst and leave crater marks on the coated surfaces. This not only mars the finish of the sintered compact but drastically reduces its optical transmission characteristics. Hence, even if the green compact is of planar rather than tubular configuration, only one of its faces or surfaces should be placed in contact with the alumina slurry and coated. Insofar as the interior surface of the tubular compact in this embodiment is formed by compressing the raw-mix particles against a metal mandrel, it inherently has a much smoother "finish" or structure than the exterior surface and thus is not in such dire need of a leveling treatment.

In accordance with a preferred embodiment of the invention, the selective treating of the tubular green compact is achieved by temporarily capping or sealing-off one end of the compact and immersing the compact, capped end downward, into a pool or bath of the "treating" slurry of alumina particles until the slurry substantially covers the compact but does not reach or flow into the open end of the compact.

After the green compact is dipped or otherwise placed in contact and coated with the "treating" slurry of alumina particles, it is dried and subjected to the usual pre-sintering and sintering operations customarily employed to convert the compact into the finished high-density polycrystalline alumina ceramic tube. Pre-sintering is achieved in the usual fashion by heat treating the green compact in air (or an oxygen-containing atmosphere) at a temperature of about 1000° C. for approximately one to ten hours to remove the hydrocarbon residues of the organic binder, lubricant, dispersant and defoamer additives. Final sintering is accomplished by heat treating the tubular bodies in a hydrogen atmosphere at a much higher temperature (in the range of 1700° C. to 1900° C.) for a period of from two to twenty-four hours. The elevated temperature of this final sintering operation densifies the pre-sintered body and forms the closely-knit crystalline structure which converts it into a hard translucent ceramic polycrystalline article.

During the pre-sintering and sintering operations, the finely-divided particles of alumina deposited in the pores and interstitial surface cavities or "low spots" on the outer surface of the green compact by the slurry-dipping treatment become integral fused parts of the finished polycrystalline alumina arc tube or body and not only level the exterior surface of the tube and provide it with a "polished" smooth finish but also increase the density of the arc tube by filling pores and other minute voids that would otherwise remain in its ceramic structure. The in-line transmission characteristic of the treated tube is thus greatly improved.

In accordance with a preferred embodiment, the aqueous alumina slurry used for the dipping or treating operation has the same basic composition as the raw-mix slurry that is spray dried to form the spherical powdered material which is used for manufacturing the green compacts. However, the solids concentration is preferably diluted (by adding distilled water) and adjusted so that it is within a range of approximately 1% to 40% by weight solids. The preferred range is from about 10% to 30% by weight solids and the optimum range is approximately 15% to 25% solids. The raw-mix slurry, in contrast, can contain from about 50% to 70% solids.

The option of using the raw-mix slurry as the "treating" slurry (after proper dilution) provides an important advantage from a cost and manufacturing standpoint since it requires the preparation of only one slurry formulation. The "treating" slurry thus contains finely-divided alumina particles of sub-micron size having an average particle size of approximately 0.3 micron. However, alumina particles having an average particle size in the range from about 0.1 micron to about 1 micron can also be employed, depending upon the size of the pores and surface cavities or voids in the green compacts or bodies to be treated. Of course, the $Al_2O_3$ particles in the slurry must be substantially free of impurities to avoid contaminating the compact and sintered arc tube. Alumina of 99.99% purity has produced excellent results.

The effectiveness of the "slurry-treating" operation of the present invention in improving the "finish" of sintered polycrystalline alumina articles and their ability to transmit visible radiations was confirmed by tests conducted by partially dipping "capped" green tubular compacts of compressed alumina powder in an aqueous alumina slurry that contained 10% solids and was made by diluting the raw-mix slurry. After drying and the conventional pre-sintering and sintering operations, the portions of the ceramic arc tubes that were treated with the alumina slurry had a "glassy" sheen and a smooth surface in contrast to the dull rough surface of the untreated portions of the tubes. The treated portions of the tubes also exhibited enhanced optical transmission properties which produced improvements as high as 50% in the in-line transmission (as measured by a Metrologic Neon Laser measuring instrument).

Such marked improvement in the in-line optical transmissivity characteristics of polycrystalline alumina bodies treated in accordance with the invention was also confirmed by a series of more carefully controlled and comprehensive tests. A total of thirty-two green tubular compacts of alumina-magnesia particles were made from the same batch of raw-mix slurry material that was spray dried and isostatically compressed in the same fashion and then divided into four groups or lots of eight pieces or compacts. In the first test, one lot was temporarily capped and dipped in a "treating" alumina slurry that was prepared by diluting the raw-mix slurry so that it contained 20% solids (and finely-divided alumina particles having an average particle size of about 0.3 micron). The other group or lot was not dipped in the slurry. The dipped compacts were then dried and, together with the control lot, were pre-sintered in an electric furnace for four hours in air at a temperature of 1100° C. Both lots were then sintered for seven hours at 1800° C. in hydrogen and the finished polycrystalline alumina ceramic tubes were measured for total transmission and maximum and minimum in-line transmission.

The remaining two lots of eight compacts each were subjected to a second test which was identical to the first test except that the dipped and undipped green tubular compacts were pre-sintered in air for ten hours at 1100° C. The results of these two series of tests are given in Tables I and II below:

TABLE I

| | Test No. 1: Tubes Pre-Sintered for 4 hrs. at 1100° C. | | | | | |
|---|---|---|---|---|---|---|
| | Lot A (Not Dipped) | | | Lot B (Dipped) | | |
| | % Total Transmission | In-line Trans. | | % Total Transmission | In-line Trans. | |
| | | Max. | Min. | | Max. | Min. |
| | 93.4 | 9.60 | 7.39 | 92.2 | 11.03 | 10.14 |
| | 93.0 | 6.01 | 5.33 | 89.2 | 8.51 | 7.60 |
| | 93.6 | 7.30 | 6.39 | 88.4 | 11.18 | 10.79 |
| | 91.4 | 6.40 | 5.46 | 92.8 | 10.28 | 8.82 |
| | 90.6 | 10.76 | 8.55 | 94.4 | 10.59 | 9.83 |
| | 89.8 | 5.27 | 4.82 | 92.0 | 11.30 | 10.02 |
| | 89.4 | 7.52 | 6.30 | 91.2 | 11.31 | 11.23 |
| | 89.0 | 5.89 | 5.22 | 90.8 | 10.27 | 9.05 |
| Avg. | 91.34 | 7.34 | 6.18 | Avg. 91.37 | 10.80 | 9.68 |
| | | | | (0.03% | (47% | (56% |

TABLE I-continued

| Test No. 1: Tubes Pre-Sintered for 4 hrs. at 1100° C. | | | | | |
|---|---|---|---|---|---|
| Lot A (Not Dipped) | | | Lot B (Dipped) | | |
| % Total | In-line Trans. | | % Total | In-line Trans. | |
| Transmission | Max. | Min. | Transmission | Max. | Min. |
| | | | Imprvmt.) | Imprvmt.) | Imprvmt.) |

TABLE II

| Test No. 2: Tubes Pre-Sintered for 10 hrs. at 1100° C. | | | | | |
|---|---|---|---|---|---|
| Lot C (Not Dipped) | | | Lot D (Dipped) | | |
| % Total | In-line Trans. | | % Total | In-line Trans. | |
| Transmission | Max. | Min. | Transmission | Max. | Min. |
| 91.8 | 7.08 | 5.72 | 92.6 | 9.15 | 7.87 |
| 92.8 | 6.52 | 5.81 | 94.0 | 11.27 | 10.97 |
| 94.4 | 6.58 | 6.30 | 94.4 | 10.69 | 9.66 |
| 93.2 | 7.05 | 6.02 | 95.0 | 10.76 | 9.67 |
| 91.2 | 6.21 | 5.23 | 92.4 | 11.17 | 10.41 |
| 92.2 | 6.70 | 5.71 | 91.2 | 11.23 | 10.39 |
| 93.2 | 7.34 | 6.17 | 94.6 | 11.31 | 11.30 |
| 94.6 | 8.31 | 6.93 | 91.0 | 7.64 | 7.32 |
| Avg. 92.92 | 6.97 | 5.98 | Avg. 93.15 (0.2% Imprvmt.) | 10.40 (49% Imprvmt.) | 9.69 (62% Imprvmt.) |

As will be noted from the test data, the average total transmission of the arc tubes that were pre-sintered for four hours at 1100° C. (Lots A and B, Test No. 1) had a percent total transmission of slightly greater than 91% and only a very small improvement (0.03%) was exhibited by the arc tubes that were dipped in the aqueous alumina slurry prior to pre-sintering. However, the maximum value for in-line transmission of the treated tubes showed a marked improvement (47%) and the minimum in-line transmission showed an even greater improvement (56%).

The results obtained with the second test (Table II) again showed that while the percent total transmission was only slightly improved (0.2%) when the green tubular compacts were dipped in the slurry and pre-sintered for ten hours rather than four hours at 1100° C., the in-line transmission was greatly improved by the treatment (49% improvement for the maximum in-line transmission and a 62% improvement for the minimum in-line transmission).

On the basis of these test data, it is believed that pre-sintering the "slurry-dipped" or treated green compacts for longer periods of time (10 hours or so) than that customarily used will provide optimum improvement in the in-line transmissive characteristics of the finished polycrystalline alumina arc tubes. However, this parameter is not especially critical and will vary depending upon the exact formulation of the treating-slurry of finely-divided alumina and the porosity and surface roughness of the compacts as well as the average particle size of the alumina particles in the slurry.

The total transmission data in the aforementioned tests were obtained in the usual manner by slipping the sintered alumina arc tubes over a light source of known intensity and then measuring the amount of transmitted light in a photometer sphere. The in-line transmission data was obtained with a Metrologic Neon Laser instrument (marketed by Metrologic Instruments Inc., Bellmawr, N.J.).

The in-line transmission characteristics of polycrystalline arc tubes for discharge lamps are especially important since improvements in this property of the fired ceramic material minimize internal reflection of radiations generated by the arc within the tube and thus allow such radiations to pass directly through the arc tube wall. This prevents the radiations from being absorbed by the arc and also tends to reduce the operating temperature of the arc tube walls.

While the arc tubes made for the aforementioned tests were manufactured by isostatically compressing the raw-mix powder into green compacts, the slurry-treating process of the present invention can also be employed to improve the in-line transmission of arc tubes (and other articles) that are formed by extruding the raw-mix material into green compacts using suitable metal dies or the like. The pore-filling and surface-leveling action of the slurry-deposited $Al_2O_3$ particles should improve the smoothness of the arc tube surfaces even though the extrusion-forming operation inherently provides such arc tubes with a finish that is quite glossy and very even.

We claim:
1. In the manufacture of a translucent body of polycrystalline alumina that is formed by (a) compressing or extruding a mixture of high-purity alumina powder, a selected small amount of magnesia and a suitable binder into a green porous compact of the desired shape, (b) pre-sintering the green compact in an oxygen-containing atmosphere at a predetermined temperature and for a sufficient period of time to remove the binder, and then (c) sintering the compact in a vacuum or a hydrogen atmosphere at a predetermined higher temperature for a period of time sufficient to convert the compact into a dense ceramic body of polycrystalline alumina, the method of enhancing the optical transmissivity of said polycrystalline alumina body comprising;
preparing an aqueous slurry that contains a predetermined quantity of finely-divided alumina particles,
placing the green porous compact in contact with the aqueous slurry so that the slurry is absorbed by the compact and thus enters the pores and coats the surface of the compact,
drying the slurry-impregnated-and-coated green compact and thereby depositing finely-divided alumina particles in the pores and interstitial surface cavities of the compact, and then sequentially subjecting the slurry-impregnated-and-coated green compact to the pre-sintering and sintering operations so that the slurry-deposited alumina particles become integral fused parts of the finished polycrystalline alumina body and improve the optical transmissivity thereof by virtue of the pore-filling and surface-leveling-and-smoothing effects produced by said slurry-deposited alumina particles.

2. The method of claim 1 wherein said aqueous slurry contains from about 1% to 40% by weight of alumina particles.

3. The method of claim 2 wherein the average particle size of the alumina particles in the aqueous slurry is in the range of from about 0.1 to 1 micron.

4. The method of claim 1 wherein the aqueous slurry is applied to the surface of the green porous compact by a spraying or dipping operation.

5. The method of claim 1 wherein the aqueous slurry contains a selected amount of a water-soluble wetting additive up to about 3% by weight.

6. A translucent sintered body of polycrystalline alumina produced by the method of claim 1, 2, 3, 4 or 5.

7. The method of claim 1 wherein;
said translucent body of polycrystalline alumina is of hollow tubular configuration and adapted for use as an arc tube component for a high-pressure electric discharge lamp, and
only the outer surface of the tubular green compact is impregnated by and coated with the aqueous alumina slurry prior to the pre-sintering and sintering operations.

8. The method of claim 7 wherein;
the aqueous alumina slurry is applied to the outer surface of the tubular green compact by dipping said compact in the slurry, and
deposition of the aqueous alumina slurry on the inner surface of the tubular green compact is prevented by temporarily closing one end of said compact and immersing the compact in the alumina slurry, closed end downward, unit the slurry substantially reaches but does not flow into the open end of the tubular compact.

9. The method of claim 7 wherein;
the tubular green compact is formed by isostatically compressing a powder that is produced by spray-drying an aqueous raw-mix slurry that contains the powdered alumina, magnesia and binder, and
a quantity of the aqueous raw-mix alumina slurry is diluted with water to reduce the solid contents thereof to a selected value and thus produce the aqueous alumina slurry which is used to impregnate and coat the tubular green compact.

10. The method of claim 9 wherein;
the aqueous raw-mix alumina slurry contains from about 50% to 70% solids, and
the diluted compact-treating aqueous alumina slurry contains from about 1% to 40% solids.

11. The method of claim 10 wherein;
the aqueous raw-mix alumina slurry contains about 60% solids, and
the diluted compact-treating slurry contains from about 10% to 30% solids.

12. The method of claim 10 or 11 wherein the aqueous raw-mix alumina slurry also contains minor selected amounts of a wetting agent, a defoaming agent and an organic lubricant.

13. The method of claim 12 wherein the aqueous raw-mix alumina slurry contains about 60% by weight high-purity alumina, about 0.06% by weight magnesia, about 6% by weight of a 20% aqueous solution of a water-soluble organic binder, about 2% by weight of an organic lubricant, and about 0.003% by weight of a defoaming agent.

14. The method of claim 12 wherein the average particle size of the powder that is produced by the spray-drying of the aqueous raw-mix alumina slurry is in the range from about 20 microns to 70 microns and the average particle size of the alumina particles in the aqueous compact-treating slurry is in the range from about 0.1 to 1 micron.

15. A translucent tubular arc tube component of polycrystalline alumina for a high-pressure electric discharge lamp produced by the method of claim 7, 8, 9, 10, 11, 12, 13 or 14.

* * * * *